United States Patent [19]

Gregg

[11] 4,130,669

[45] Dec. 19, 1978

[54] METHOD OF MAKING AN IMPROVED TEA VOLATILES CONCENTRATE

[75] Inventor: Richard Gregg, Greenhills, Ohio

[73] Assignee: The Procter & Gamble Company, Cincinnati, Ohio

[21] Appl. No.: 808,759

[22] Filed: Jun. 22, 1977

[51] Int. Cl.² ............................................... A23F 3/00
[52] U.S. Cl. .................................. 426/385; 426/478; 426/597; 426/386
[58] Field of Search ................ 426/386, 385, 597, 478

[56] References Cited

U.S. PATENT DOCUMENTS

| | | | |
|---|---|---|---|
| 3,244,532 | 4/1966 | Mahlman | 426/386 |
| 3,717,472 | 2/1973 | Strobel | 426/386 X |
| 3,997,685 | 12/1976 | Strobel | 426/597 X |

FOREIGN PATENT DOCUMENTS

| | | |
|---|---|---|
| 563792 | 5/1973 | Switzerland. |
| 1466881 | 3/1977 | United Kingdom. |

OTHER PUBLICATIONS

Pintauro, Tea and Soluble Tea Products, 1977, Noyes Data Corp.: Park Ridge, N. J., pp. 181-184.
Trade Bulletins on Model KM 300D Littleford Mixers, Littleford Bros. Inc., Cincinnati, Ohio.

*Primary Examiner*—Joseph M. Golian
*Attorney, Agent, or Firm*—Richard C. Witte; Leonard Williamson; Rose Ann Dabek

[57] ABSTRACT

A method of steam-stripping and recovering desirable volatiles from ground tea leaves by subjecting them to conditions which preserve the freshness of the tea volatiles as well as the freshness of the soluble solids remaining in the devolatilized tea. A bed of mechanically fluidized ground tea leaves is sprayed with 32°-160° F. water and contacted with steam in free space for devolatilization under an absolute pressure of 5-250 mm of Hg and a temperature of 32°-160° F. The resulting volatiles-laden steam is then freeze-condensed under an absolute pressure of about 0-80 mm Hg and under super-cold conditons to provide a frost. A tea volatiles-containing concentrate is prepared by contacting the frozen condensate, the frost, with an aqueous tea extract.

7 Claims, No Drawings

METHOD OF MAKING AN IMPROVED TEA VOLATILES CONCENTRATE

BACKGROUND OF THE INVENTION

This invention relates to a method or process for the preparation of a tea product. More particularly, it relates to a process for steam-stripping desirable volatiles from ground tea and preparing a tea concentrate containing those volatiles.

Many methods have been described for the production of tea aromatic products. See *Tea and Soluble Tea Products Manufacture*, Nicholas D. Pintauro, Noyes Data Corp., Park Ridge, New Jersey, USA, 1977, pp. 180–212 for a comprehensive disclosure of such methods. Illustrative of such methods are those described in U.S. patents: Strobel, U.S. Pat. No. 3,717,472, February, 1973; Inredeco, Inc., British Pat. No. 855,423, Nov. 30, 1960; and D. Wetherilt, U.S. Pat. No. 2,912,334, Nov. 10, 1959 assigned to Afico SA, Switzerland. Extraction and simultaneous stripping of aromatics is described by Afico SA, British Patent No. 946,346, Jan. 8, 1964.

The flavors and aromas of freshly brewed tea have generally tended to be the standard against which soluble or "instant" tea products have been judged and efforts have, thus, been principally directed toward duplicating in soluble products those qualities of flavors and aromas of freshly brewed tea. Prior attempts for the most part have involved the addback to tea extracts of tea volatiles separated from tea by a variety of techniques. The separation and recovery of high quality tea volatiles has not, however, been entirely successful. Processing inefficiencies and complexities and undesirable flavor degradation of the tea volatiles or devolatilized tea, e.g., harshness or bitterness, have been especially evident.

It is an object of the present invention to provide a process for preparing a concentrate of tea volatiles for use in a soluble tea product to provide enhanced flavor and aroma qualities.

It is an object of the present invention to provide a high-quality tea volatiles concentrate.

It is another object of the present invention to provide an improved process for steam stripping tea aromatics from ground tea leaves.

These and other objects and advantages of the present invention will become apparent from the detailed description provided hereinafter.

SUMMARY OF THE INVENTION

The objects of the present invention are achieved by the employment of certain processing conditions more fully described hereinafter. It has been discovered that the combination of the present steam-stripping and tea volatiles recovery operations will permit the production of a high-quality tea volatiles concentrate which, when blended with certain other tea products, provides flavor and aroma enhancement.

In its essential aspects, the process of the present invention comprises: (a) uniformly wetting ground tea leaves, preferably while they are in a state of fluidization, mixing in free space, with from about 0.1–3.0 parts water per part of tea; preferably from about 0.3–2 parts water per part tea; (b) contacting the fluidized tea leaves with from about 0.005–0.2 parts steam per part ground tea to strip volatiles therefrom, the tea particles being contacted with said steam under an absolute pressure of about 5–250 mm of mercury and for a period of about 0.1 to about 45 minutes, and at a temperature of 32°–160° F.; (c) collecting volatiles-laden steam in the form of a frost by condensing at a temperature of from −100° F. to −320° F. (−73.33° to −195.56° C.) and at an absolute pressure of about 0 to 80 mm of mercury; (d) melting the frost to form a tea volatiles concentrate by contacting said frost with at least an equal weight of an aqueous tea extract having from about 15%–65% solids.

DETAILED DESCRIPTION OF THE INVENTION

The process of this invention involves subjecting ground tea leaves to a particular combination of processing steps for devolatilization and the preservation of those tea volatiles. A principal step of the process of the invention is a steam-stripping or devolatilization step whereby ground tea leaves are subjected to the effects of contact with steam under certain conditions described hereinafter. This operation is carried out at a temperature of from about 32° F. to about 160° F. and under absolute pressure of about 5 to about 250 mm of mercury so that the volatiles might be removed from the tea leaves without degrading the flavors and aromas in those volatiles or the flavors or taste of the soluble tea solids remaining in the devolatilized tea leaves.

One aspect of the steam-stripping operation is the uniform wetting of the ground tea leaves, preferably while they are hurled and whirled in a state of fluidization in free space. About 0.1 to about 3.0 parts of water per part of ground tea is required to facilitate the release of the tea volatiles at the moderate operating temperatures. The wetting water temperature range is from about 32° F. to about 160° F.

The steam-stripping operation may be continuous or a batch operation. The ground tea leaves are sprayed with water while being contacted with from about 0.005 to about 0.2 parts of steam per part of ground tea leaves. In a continuous operation, the wetting or spraying and the contacting with steam are simultaneous and continuous operations.

The volatiles are released in the form of volatiles-laden steam. The steam contact time for the devolatilization operation per ground tea leaf particle is from about 0.1 to about 45 minutes, preferably from about 0.5 to about 10 minutes. Fluidization while steam-stripping, time, temperature and pressure as described herein are critical and maximize the speedy recovery of fresh tea volatiles by avoiding the less favorable conditions which have been found to degrade those volatiles as well as the flavors of the soluble tea solids left in the devolatilized tea leaves. The mechanical fluidization of the tea leaves during the steam-stripping step is very important in the practice of the present invention. it provides uniform steam-stripping by allowing intimate contact between the steam and the tea leaves in free space. Moreover, it allows the steam-stripping operation to be conducted at lower temperatures and pressures without increasing the pressure drop across the tea bed. "Mechanical fluidization" means that the ground tea leaves are continuously hurled and whirled into free space by a mechanical means as distinguished from forced gas.

The grind size of the ground tea leaves subjected to devolatilization can vary widely. The preferred average size range is from 25 to about 1000 microns.

The volatiles-laden steam which is generated by the devolatilization or steam-stripping step is drawn from the vessel or chamber in which the operation is performed and collected in a condenser in the form of frost. The condenser must be maintained at a temperature of from about −100° F. (−73.33° C.) to about −320° F. (195.56° C.) and at an absolute pressure of from about 0 to 80 mm of mercury. Again, these temperatures are important to achieve the desired quality of flavors and aromas in the final tea volatiles concentrate. It has been found that condensation of the volatiles-laden steam at higher temperatures and pressures results in unsatisfactory products.

The frozen condensate, the frost, is melted to provide a tea-volatiles concentrate. This is done by contacting the frost with an aqueous tea extract of at least an equal amount by weight of said frost and having a solids content of from about 15% to about 65% soluble solids. The weight ratio of said aqueous tea extract to said frost is preferably from about 1:1 to about 10:1, but larger amounts of extract can be used. The percentage of soluble solids in said aqueous tea extract is preferably 27% to 50%. It is, however, critical that the melting of the frost is done in this fashion for it has been found that if the frost is allowed to melt by itself at room temperature or below, an unsatisfactory product results.

The tea volatiles concentrate resulting from the melt can be further concentrated and dried, preferably, freeze-concentrated and freeze-dried. Preferably, the tea volatiles concentrate is dry mixed with a dried base tea extract at a level of from about 5% to about 25% on a dry weight basis for an improved instant tea. Alternatively, the tea volatiles concentrate melt is mixed with an aqueous or dried tea base extract and the mixture dried to provide an improved instant tea.

The soluble tea solids remaining in the devolatilized tea may be extracted by resort to known extraction methods. See Pintauro, *Tea and Soluble Tea Products Manufacture,* Noyes Data, 1977, pp. 39–80. It has been found that the flavors or taste of those soluble tea solids are still fresh although the volatiles have been removed by the steam-stripping operation of the present invention.

The process of this invention will be further understood by reference to the following example.

EXAMPLE I

About 400 pounds of Lipton ® Orange Pekoe and Pekoe cut black tea blend were ground at an ambient temperature of 70° F. with a hammermill grinder to an average particle size of about 500 microns. The grinder used in this operation was a Fitz ® Mill Model U Granulator/Comminutor, manufactured by the Fitzpatrick Co., Elmhurst, Ill. 60126 and described in its Bulletin No. 202.

The ground tea particles were fed into a mechanically fluidized bed (provided by a 10.3 cubic foot, 0.29 cubic meter, continuous Littleford ® Mixer, Model KM 300D, manufactured by the Littleford Bros., Inc., Cincinnati, Ohio 45226) at a flow rate of about 45 pounds per hour.

Plow-shaped mixing tools rotating at high speeds inside the horizontal mixing shell imparted rapid hurling-and-whirling motion to the ground tea leaves, turning them into a turbulent fluidized state in free space. In other words, the plows lift, drop and push the materials from the drum walls into free space so that rapid uniform wetting and intimate steam contact takes place without adverse effect on the fragile tea particles.

The fluidized ground tea leaves were uniformly wet with about 1.0 parts water per part of the tea. The temperature of the water was about 75° F. The water was dispersed into the mixing chamber (drum) of the mixer by spraying water on choppers to obtain uniform wetting. Independently-driven rotating choppers arranged between the paths of the plows atomized the water as well as broke up agglomerates or lumps which existed in the tea bed that may have formed during the operation. The water was sprayed on the tea particles in the mixing chamber at a flow rate of about 45 pounds per hour.

A stream of cool steam was introduced into the chamber counter-current to the flow of the wet fluidized tea particles at a flow rate of about 2.3 pounds (1.04 kg) per hour. When the steam entered the vacuum chamber, its temperature was about 80° F. Inside the mixing chamber was held under an absolute pressure of about 27 mm of mercury. The fluidized bed temperature was about 80° F. These conditions were maintained throughout the operation with little variation. The steam made intimate contact with the mechanically fluidized tea particles in free space for an average time of about 1.2 minutes and thereby stripped them of their volatiles. The products of this operation are called herein volatiles-laden steam and devolatilized tea.

The volatiles-laden steam passed out of the mixing chamber through a gravity solids separator to remove any carryover of ground tea particles and was then collected in the form of a frost by freeze-condensation on the walls of a four-liter glass vacuum flask. The vacuum flask was held under an absolute pressure of about 12 mm of mercury and at a temperature of about −320° F. with a liquid nitrogen jacket and a vacuum pump.

About 1.1 pounds of the volatiles-laden frost were recovered in about 30 minutes, and a tea-volatile concentrate melt was made therefrom by contacting frost with about 1300 grams of a 30% solids, aqueous tea extract made from Lipton ® instant tea. The tea volatile concentrate melt was poured into freeze trays and frozen to −40° F. Frozen slabs of tea volatile concentrate were removed from the trays and ground in a Fitz ® Mill Model U Granulator. The frozen granules were kept cold and the finer granules removed by sifting them through a 32-mesh U.S. Standard screen. The larger granules were vacuum freeze-dried (1 mm Hg). The yield was 0.7 pound of dried tea volatile concentrate.

The soluble tea solids remaining in the devolatilized tea leaves were extracted in a slurry extraction operation using about 5:1 water/tea ratio at a temperature of about 80° F. The devolatilized tea and water were mixed in a holding tank and fed into the slurry extraction tank at a flow rate which allowed an average particle a residence time of about 20 minutes. The slurry was gently agitated with a cone-tipped leaf paddle contoured to the shape of the extraction tank. The extract was filtered. The filtrate, which had an average solids concentration of about 5.8% solids, was concentrated by evaporation to 22% and then freeze-dried to provide a substantially dry base tea extract powder.

The freeze-dried volatiles concentrate was added to the freeze-dried base tea extract powder at a level of about 20% to provide a final improved instant tea product. A panel of expert tea tasters judged this improved instant tea to be of marked improvement in flavor and aroma over commercially available instant teas.

What is claimed is:

1. A method for preparing a tea volatiles concentrate from ground tea leaves comprising the steps of:
    (a) uniformly wetting said ground tea with from about 0.1 to about 3.0 parts water per part of ground tea, said water being at a temperature of from about 32° F. to about 160° F.;
    (b) contacting said ground tea while, in a state of fluidization in free space, with from about 0.005 to about 0.20 parts steam, per part of ground tea, thereby to provide volatiles-laden steam and devolatilized ground tea; said contact being conducted under an absolute pressure of from about 5 to about 250 mm of mercury, the steam having a temperature of from about 32° F. to about 160° F., said ground tea making contact with said steam for about 0.1 to about 45 minutes;
    (c) collecting the volatiles-laden steam as a frost by freeze condensation at a temperature of from about −100° F. to about −320° F. and at an absolute pressure of from about 0 to about 80 mm of mercury;
    (d) melting the frost to form a tea volatiles concentrate by contacting the frost with at least an equal weight of an aqueous tea extract having a solids content of from about 15% to about 65%; and wherein said fluidization is mechanically induced within a horizontal mixing shell by mixing tools which rotate within said shell at high speeds sufficient to impart rapid hurling-and-whirling motion to the ground tea leaves, said mixing tools being so designed such as to lift, drop and push the ground tea leaves from the walls of said shell into free space so that intimate steam contact takes place without adverse effect on said ground tea leaves.

2. The method of claim 1 wherein said aqueous tea extract has a solids content of from about 27% to about 50% solids and wherein the weight ratio of said aqueous tea extract to said frost is from about 1.1 to about 10.1.

3. The method of claim 1 wherein said method is a continuous process.

4. The method of claim 3 wherein said ground tea has an average particle size of from about 25 to about 1000 microns.

5. The method of claim 3 wherein said ground tea is in contact with said steam for about 0.5 to about 10 minutes.

6. The method of claim 1 wherein said tea volatiles concentrate is freeze-dried.

7. The method of claim 1 wherein said wetting is conducted while the ground tea leaves are mechanically hurled and whirled in free space.

* * * * *

UNITED STATES PATENT AND TRADEMARK OFFICE
CERTIFICATE OF CORRECTION

PATENT NO. : 4,130,669

DATED : December 19, 1978

INVENTOR(S) : Richard Gregg

It is certified that error appears in the above-identified patent and that said Letters Patent are hereby corrected as shown below:

Col. 6, line 12 (Claim 2, line 4), "1.1 to about 10.1"

should read -- 1:1 to about 10:1 -- .

Signed and Sealed this

Seventeenth Day of April 1979

[SEAL]

Attest:

RUTH C. MASON
Attesting Officer

DONALD W. BANNER
Commissioner of Patents and Trademarks